(No Model.)
T. B. ZELLER.
ANIMAL TRAP.
No. 357,650. Patented Feb. 15, 1887.
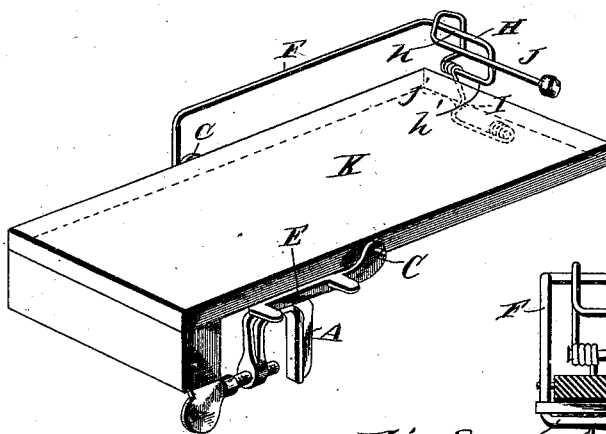
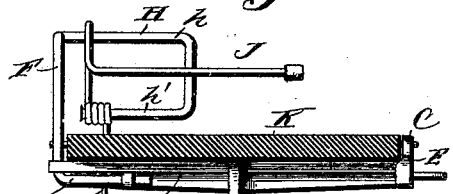
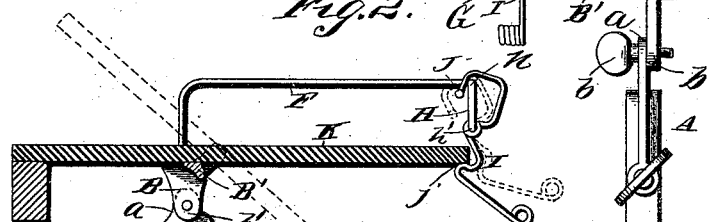
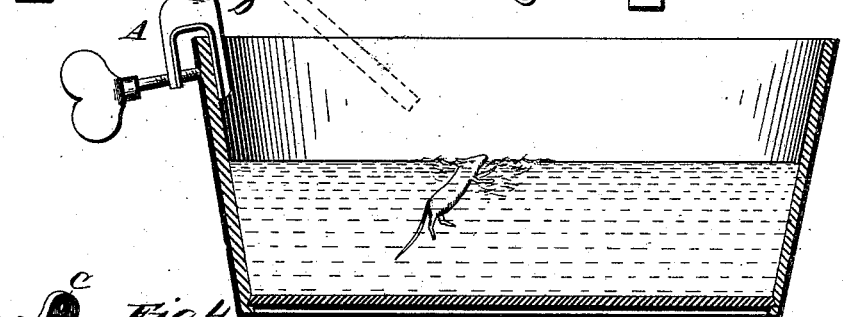
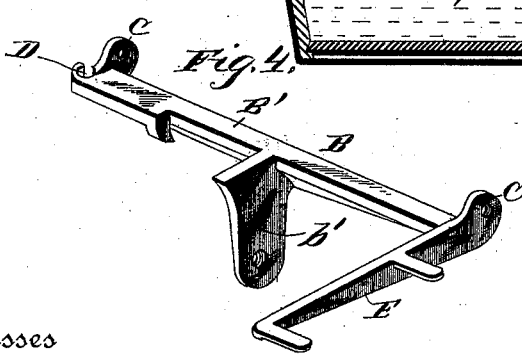
Witnesses
Inventor
Thos. B. Zeller
By his Attorneys

UNITED STATES PATENT OFFICE.

THOMAS B. ZELLER, OF FRANKLIN, PENNSYLVANIA, ASSIGNOR OF ONE-HALF TO F. P. SAYLOR, OF SAME PLACE.

ANIMAL-TRAP.

SPECIFICATION forming part of Letters Patent No. 357,650, dated February 15, 1887.

Application filed December 30, 1886. Serial No. 223,028. (No model.)

*To all whom it may concern:*

Be it known that I, THOMAS B. ZELLER, a citizen of the United States, residing at Franklin, in the county of Venango and State of Pennsylvania, have invented new and useful Improvements in Animal-Traps, of which the following is a specification.

My invention relates to improvements in animal-traps, and relates particularly to improvements on the trap for which Letters Patent No. 272,507 were granted to me February 20, 1883.

The invention consists in certain novel features of the device shown in the accompanying drawings, as will be hereinafter fully described and claimed.

In the drawings, Figure 1 is a perspective view of the trap. Fig. 2 is a longitudinal vertical sectional view thereof, showing it applied to a vessel containing water. Fig. 3 is a vertical cross-section of the trap, and Fig. 4 is a detail perspective view of the supporting-bracket.

Referring to the drawings by letter, A designates an ordinary clamping-brace, to which is pivotally secured the supporting-bracket B. This bracket is secured to the clamp A by means of a thumb-screw, $b$, passed through aligned openings in an ear, $a$, on the clamp, and a lug, $b'$, on the bracket. The bracket consists of a cross-bar, B', the length of which slightly exceeds the width of the tilting table or trap-door, and is provided at its ends with the upwardly-projected lugs C, provided with perforations, through which pivot-pins are inserted into the edges of the trap-door. At one end, also, the cross-bar B' is provided with a hook, D, forming an integral part thereof, and at its opposite end the cross-bar is provided with a backwardly-extending arm, E, which serves to support the upper end of the inclined board up which the animal passes to the trap.

F is a bracket, which extends from the supporting-bracket to the tilting end of the trap-door. This bracket is composed of a stout wire or similar material formed to provide the L-shaped hook G at one end, the base of which is secured to the under side of the cross-bar B', and the vertical portion of which extends upward through the hook D. From the upper end of this L-shaped portion G the bracket extends longitudinally of the trap-door to the inner end thereof, and is then so constructed as to form the U-shaped trigger and bait-hook support H, the legs of the U extending horizontally inward transversely to the end of the trap-door, and the cross-bar of the U connecting the inner ends of the legs.

The trigger I and bait-hook J are formed integral with each other, and are composed of a single piece of wire, which is bent to form the bait-hook, and then extended up over and behind the upper leg, $h$, of the support H, and then coiled around the lower leg, $h'$, of the support H one or more times, in order to fulcrum the trigger and bait-hook upon said leg. From the lower leg or fulcrum-bar, $h'$, the trigger depends, and it is formed by extending the wire downward in a straight line a distance equal to the thickness of the trap-door, and then bending it to form the shoulder $j$, from which it is extended a suitable distance and its end enlarged or provided with a weight sufficiently heavy to counterbalance the bait.

K is the trap-door, which is pivotally supported upon the bracket B, as before stated. The outer end of the trap-door is made heavier than the inner end by adding weight to its under side, or any other preferred method, in order to automatically return the trap-door to its normal horizontal position after it has been tripped.

It will be observed that the lug $b$, depending from cross-bar B' of the bracket B, has its upper end extended in the same horizontal plane with the upper side of the cross-bar B', and that the inner side of the said cross-bar is inclined. This construction, it is apparent, provides a stop to limit the downward or tilting movement of the trap-door, and also a stop to limit the reverse movement of the same and hold it in a horizontal position when at rest.

The operation of the device will be readily understood. The device is secured to the side of a vessel containing water, and an inclined board is rested against the arm E. The animal is attracted by the bait previously placed upon the bait-hook, and passes up the inclined board to the trap-door and over the trap-door to the bait. When the animal attempts to bite the bait he pulls upon the same and the hook, and consequently draws the trigger from under the end of the trap-door, whereupon the trap-door immediately tilts and precipitates the victim into the water. The trap-door automatically returns to its place and the trap is ready for another victim.

The trap can be readily set upon the vessel so that the trap-door will be normally horizontal, whatever may be the arrangement of the sides of the vessel, whether vertical or inclined. This is effected by securing the clamp A to the side of the vessel, then loosening the thumb-screw $a$ slightly, then adjusting the bracket to a position in which it will normally hold the trap-door in a horizontal position.

It will be seen that my present trap can be readily and securely fastened to any vessel, which could not be done with my former trap. It will also be seen that the victim stands upon a solid footing until he releases the trigger by pulling the bait-hook, which is a decided improvement upon my former trap, as its readiness to tilt rendered its operation uncertain.

Having thus described my invention, what I claim, and desire to secure by Letters Patent, is—

1. In an automatic animal-trap, the combination, with a clamp for securing the trap to the side of a vessel, of a bracket for supporting the trap-door or swinging platform, said bracket being adjustably secured to the clamp, substantially as set forth.

2. The combination of the clamp, the trap-supporting bracket adjustably secured to the clamp, the swinging platform pivotally secured to the trap-supporting bracket, the bracket F, and the combined bait-hook and trigger carried by said bracket F, substantially as set forth.

3. The combination of the trap-supporting bracket, the trap-door pivotally secured thereto, the bracket F, secured to the trap-supporting bracket and provided at one end with a U-shaped trigger and bait-hook support arranged transversely to the end of the trap-door, and the trigger and bait-hook fulcrumed upon said U-shaped support, substantially as specified.

4. The trap-supporting bracket consisting of the cross-bar B′, provided with the depending lug $b'$ and the end lugs, C, the hook D, and arm E, in combination with the clamp, the trap-door, the bracket F, and the bait-hook and trigger, substantially as described and shown.

5. In an animal-trap, the combination of the swinging platform, the bracket F, and the bait-hook and trigger composed of a single piece of wire and carried by said bracket F, the said bait-hook and trigger having its upper end bent up and around the end of the bracket to form the bait-hook and provided with a shoulder for supporting the free end of the swinging platform, substantially as set forth.

6. In an animal-trap, the combination of the clamp for securing the trap to the side of a vessel, the trap-supporting bracket adjustably secured to said clamp, the swinging platform mounted upon said bracket, the bracket F, and the bait-hook and trigger composed of a single piece of wire and carried by said bracket F, the said bait-hook and trigger having its upper end bent up and around the end of the bracket to form the bait-hook and provided with a shoulder for supporting the free end of the swinging platform, substantially as set forth.

In testimony that I claim the foregoing as my own I have hereto affixed my signature in presence of two witnesses.

THOMAS B. ZELLER.

Witnesses:
FRANKLIN P. SAYLOR,
E. A. WILSON